No. 777,406. PATENTED DEC. 13, 1904.
M. E. DOUANE.
APPARATUS FOR MAKING METHYL CHLORID.
APPLICATION FILED SEPT. 15, 1904.
NO MODEL. 3 SHEETS—SHEET 1.

Witnesses:
Henry Thieme.
F. George Barry,

Inventor:
Maurice Ernest Douane
By attorneys
Blount & Seward

No. 777,406. PATENTED DEC. 13, 1904.
M. E. DOUANE.
APPARATUS FOR MAKING METHYL CHLORID.
APPLICATION FILED SEPT. 15, 1904.
NO MODEL. 3 SHEETS—SHEET 2.
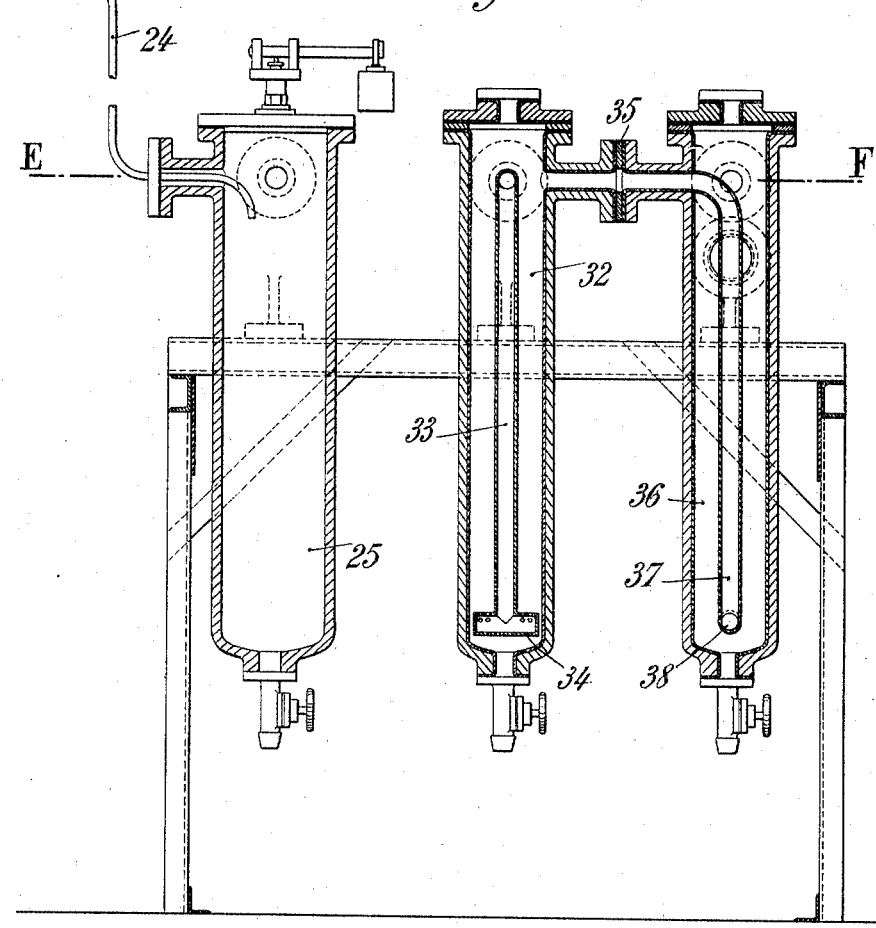
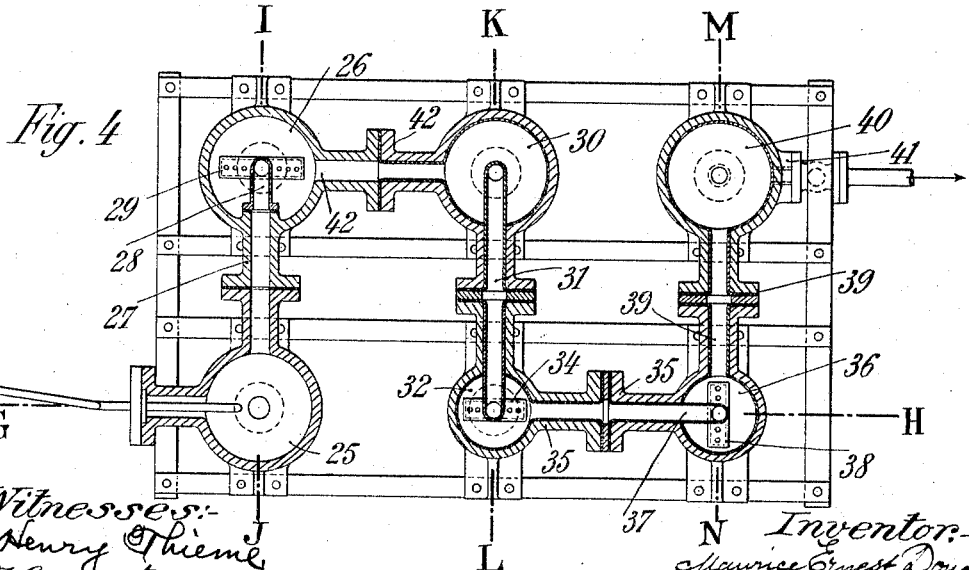

No. 777,406. PATENTED DEC. 13, 1904.
M. E. DOUANE.
APPARATUS FOR MAKING METHYL CHLORID.
APPLICATION FILED SEPT. 15, 1904.
NO MODEL. 3 SHEETS—SHEET 3.
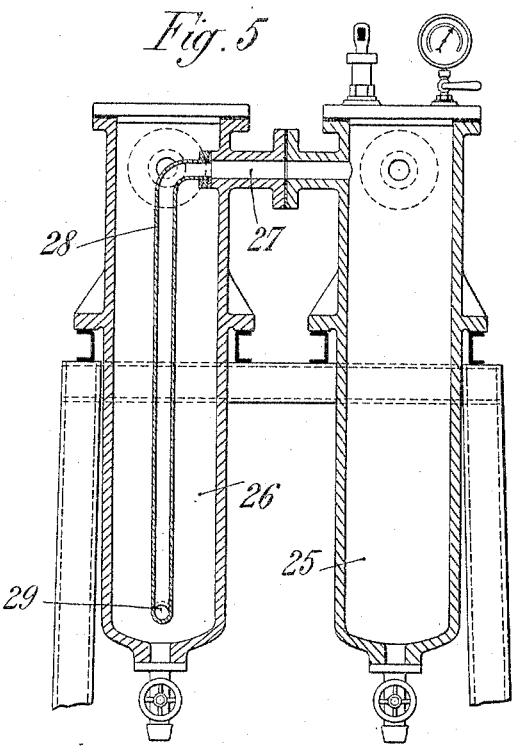
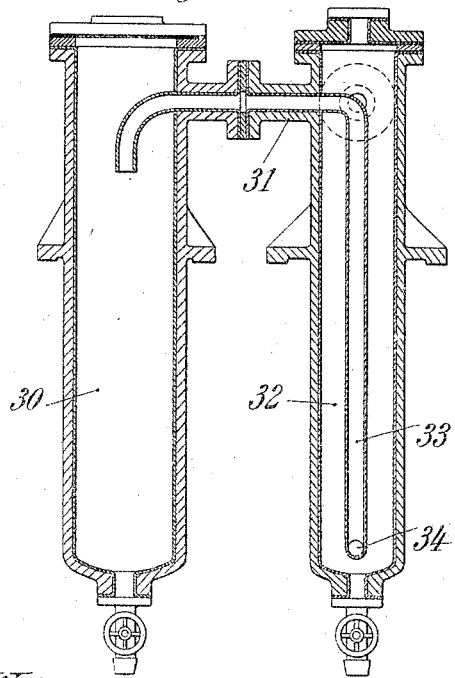
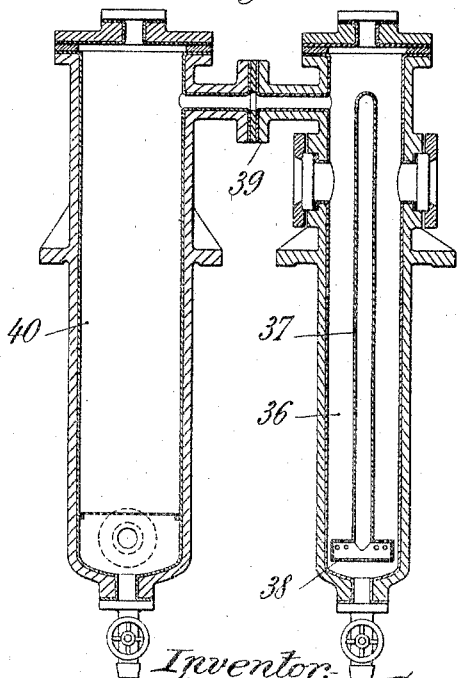

No. 777,406.  
Patented December 13, 1904.

UNITED STATES PATENT OFFICE.

MAURICE ERNEST DOUANE, OF PARIS, FRANCE.

APPARATUS FOR MAKING METHYL CHLORID.

SPECIFICATION forming part of Letters Patent No. 777,406, dated December 13, 1904.

Application filed September 15, 1904. Serial No. 224,615. (No model.)

*To all whom it may concern:*

Be it known that I, MAURICE ERNEST DOUANE, engineer, a citizen of the Republic of France, and a resident of 23 Avenue Parmentier, Paris, France, have invented a new and useful Improvement in Apparatus for Making Methyl Chlorid, of which the following is a specification.

This invention relates to apparatus for manufacturing methyl chlorid by the action of hydrochloric acid on methyl alcohol. Its object is to regulate and accelerate the operation by facilitating the heating and cooling of the apparatus, which are known to be necessary, and to obtain methyl chlorid quite free from acid, water, or other impurities. These results are attained in the first place by constructing the autoclave in which the two reacting substances are placed as an annular chamber such that the mixture can be heated or cooled in a relatively thin layer on both sides of this layer simultaneously; secondly, the washing vessels wherein the methyl chlorid is purified after it has been produced are combined with collecting vessels which stop and collect the impurities carried by the gas.

The accompanying drawings illustrate the improvements.

Figure 1:
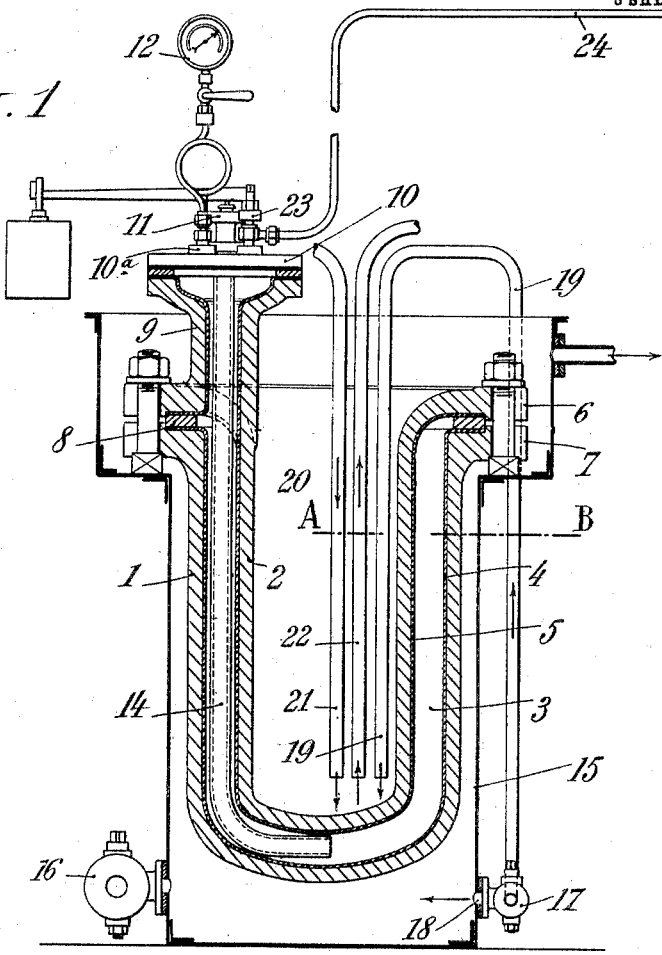
Figure 2:
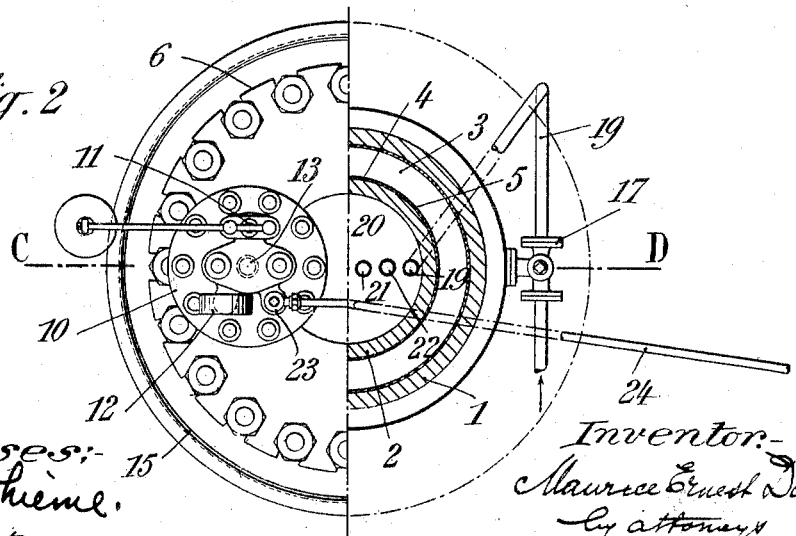

Figure 1 is a vertical section of the improved autoclave on line C D of Fig. 2, part being in elevation. Fig. 2 is a plan of the autoclave, the right-hand half being in section on line A B of Fig. 1. Fig. 3 is a vertical section of the washing and collecting vessels on line G H of Fig. 4. Fig. 4 is a horizontal section on line E F of Fig. 3. Figs. 5, 6, and 7 are vertical sections on lines I J, K L, and M N, respectively, of Fig. 4.

The apparatus comprises an autoclave, Figs. 1 and 2, formed of two vessels 1 and 2, one within the other and having an annular space 3 between them to receive the methyl alcohol and hydrochloric acid. The vessels 1 and 2 being preferably constructed of cast iron or steel thick enough to resist the pressures developed during the operation, those parts of their surfaces which come in contact with the liquid are covered with lead, as at 4 and 5.

The vessels 1 and 2 are firmly united by bolts passing through flanges 6 and 7, the joint between them being made good by a ring 8, the two faces of which have concentric ridges which are pressed into the lead linings 4 and 5, these being turned over the face of each flange for this purpose.

The vessel 2 carries a tubulure 9, closed by a plate 10, on which are mounted a weighted safety-valve 11 and a manometer 12. It has also an opening 13 for filling and emptying the autoclave, in which fits a tube 14 and which may be closed by a plate $10^a$. For filling, this plate $10^a$ is removed and the materials, which are liquid, are poured through orifice 13 and pipe 14. For emptying, the plate $10^a$ is exchanged for one carrying a curved pipe, and the contents of the autoclave are expelled through pipe 14 and this curved pipe by a slight excess of pressure which has been generated in the autoclave. The tubulure 9 is also provided with a valve 23, through which the methyl-chlorid vapor produced in the autoclave escapes therefrom.

The whole autoclave is set in a reservoir 15, constituting a water-bath and of considerably greater diameter at top than at bottom to accommodate the flanges of the vessels 1 and 2. At the bottom of this reservoir there is a three-way cock 16 for admission and withdrawal of water and a three-way steam-cock through which steam may be passed by way of port 18 to heat the water in the reservoir and by way of pipe 19 to heat water in the interior space 20 of the inside vessel of the autoclave.

Two pipes 21 and 22 are provided, the former for introducing water into the space 20 and the latter for withdrawing the water by siphoning, ejection, suction, or the like.

The autoclave just described is connected by a pipe 24, fitted to the valve 23, with a series of receivers, some for washing the methyl-chlorid vapor and others for the liquid which may be carried over. Such pipe might of course conduct the vapor to these receivers from several autoclaves instead of one only. The vapor arriving by pipe 24 enters a first receiver 25 for collection of liquid carried over from the autoclave or that coming from a receiver 26, which is in communication with receiver 25 through tubulures 27. The vapor then passes through pipe 28 and distributer 29, Figs. 4 and 5, to the bottom of receiver 26, containing milk of lime, through which the vapor thus travels. Receiver 26 is connected by tubulures 42 with a second collecting vessel 30, Figs. 4 and 6, wherein collects the liquid carried over from receiver 26 or that from a receiver 32, wherewith receiver 30 is in communication through the tubulures 31. The methyl chlorid passes through these tubulures, pipe 33, and distributer 34 to the bottom of receiver 32, which contains sulfuric acid to dry the vapor. Receiver 32 is connected by tubulures 35 with receiver 36, and the methylchlorid vapor which has passed vertically through the washing liquid in receiver 32 passes by pipe 37 and distributer 38 to the bottom of a column of sulfuric acid contained in receiver 36. The latter is in communication through tubulures 39 with a third collecting vessel 40, containing a column of coke impregnated with sulfuric acid. Finally the vapor passes by tubulure 41 either directly to a condenser or first to a compressor which forwards it to a condenser. Liquid methyl chlorid is thus obtained, as usual, but in a state of greater purity.

The receivers which contain acid washing liquors—such as receivers 30, 32, 36, and 40, as well as the tubulures joining them—are coated internally with lead.

All the receivers are provided with draw-off cocks and the necessary accessory apparatus, such as valves and manometers.

Having thus described the nature of my said invention and the best means I know of carrying the same into practical effect, I claim—

1. In an apparatus for making methyl chlorid from methyl alcohol and hydrochloric acid, two vessels, one contained within the other so as to form an annular closed chamber to contain the said methyl alcohol and hydrochloric acid, means for filling and emptying the said chamber, a vessel surrounding the said two vessels, means for bringing a liquid and a heating agent into the innermost vessel and the said surrounding vessel and means to remove the said liquid and heating agent.

2. In an apparatus for making methyl chlorid from methyl alcohol and hydrochloric acid, two vessels, one contained within the other so as to form a closed annular chamber to contain the said methyl alcohol and hydrochloric acid, a tubulure to the said chamber, a plate closing the said tubulure, an orifice in the said plate, a pipe fitted to the said orifice and extending within the said annular chamber to the bottom part thereof, a second plate fixed on the first-named plate, a vessel surrounding the said two vessels, means for bringing a liquid and a heating agent into the innermost vessel and the said surrounding vessel, and means to remove this liquid and heating agent.

3. In an apparatus for making methyl chlorid from methyl alcohol and hydrochloric acid, two vessels, one contained within the other so as to form a closed annular chamber to contain the said methyl alcohol and hydrochloric acid, means for filling and emptying the said chamber, a vessel surrounding the said two vessels, means for bringing a liquid and a heating agent into the innermost vessel and the said surrounding vessel, means for removing the said liquid and heating agent, washing vessels in communication with the said annular chamber, vessels for collecting liquid arranged between the said washing vessels when these contain different washing agents, and other vessels for collecting liquid at the beginning and end of the series of washing vessels.

4. In an apparatus for making methyl chlorid from methyl alcohol and hydrochloric acid, two vessels, one contained within the other so as to form a closed annular chamber to contain the said methyl alcohol and hydrochloric acid, means for filling and emptying the said chamber, a vessel surrounding the said two vessels, means for bringing a liquid and a heating agent into the innermost vessel and the said surrounding vessel, means for removing the said liquid and heating agent, collecting vessels and washing vessels, and a condenser, all the said collecting and washing vessels being connected together to form a battery placed between the said annular chamber and the said condenser.

In testimony that I claim the foregoing as my invention I have signed my name, in presence of two witnesses, this 31st day of August, 1904.

MAURICE ERNEST DOUANE.

Witnesses:
HANSON C. COXE,
EUGÈNE GINJARD.